No. 759,541. PATENTED MAY 10, 1904.
C. H. MONTGOMERIE Y AGRAMONTE.
BURNER CASING.
APPLICATION FILED NOV. 30, 1903.
NO MODEL.
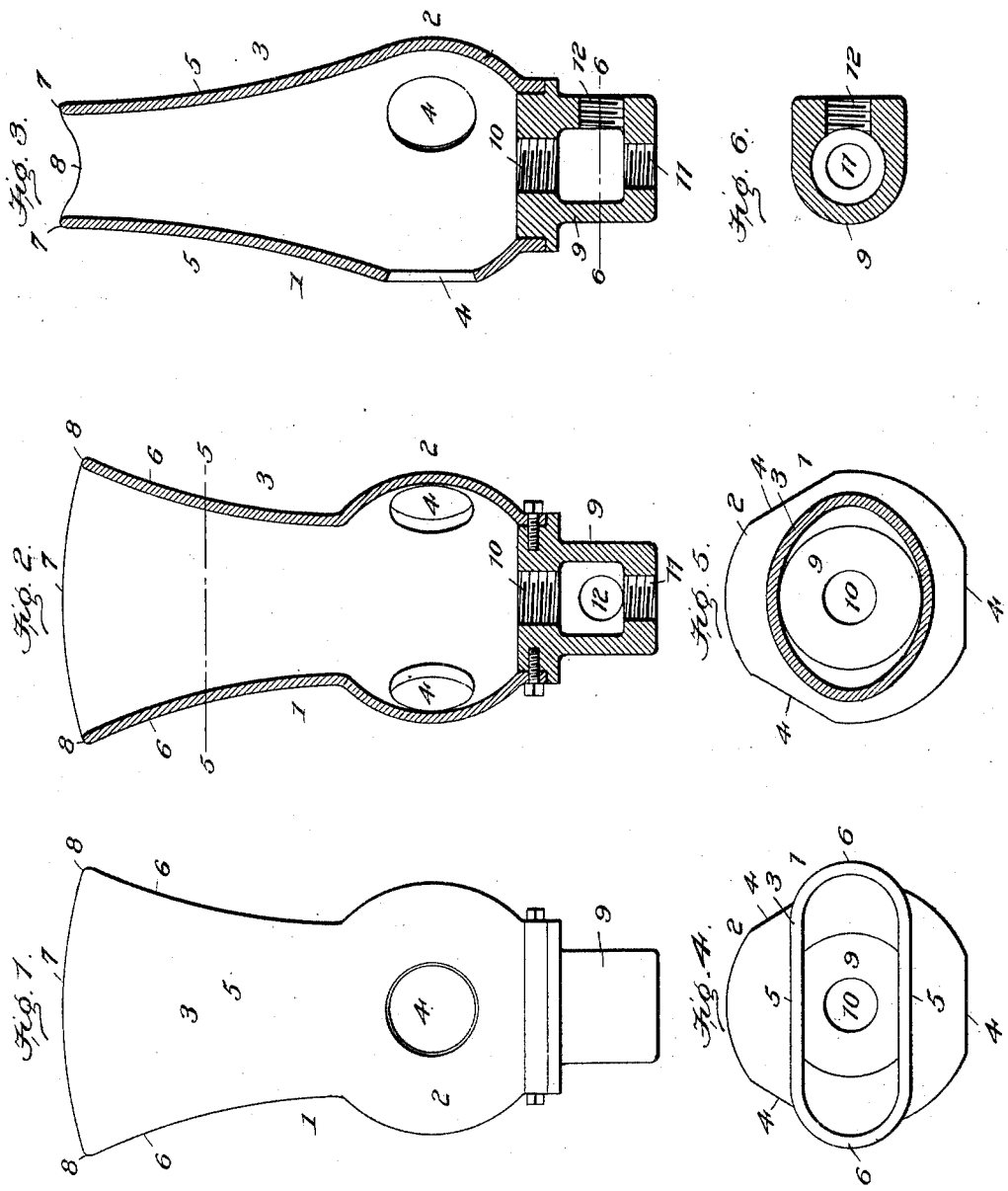
Inventor
Clarence Horace Montgomerie y Agramonte
Witnesses
By
Attorneys No. 759,541.

Patented May 10, 1904.

UNITED STATES PATENT OFFICE.

CLARENCE HORACE MONTGOMERIE Y AGRAMONTE, OF MEXICO, MEXICO.

BURNER-CASING.

SPECIFICATION forming part of Letters Patent No. 759,541, dated May 10, 1904.

Application filed November 30, 1903. Serial No. 183,300. (No model.)

*To all whom it may concern:*

Be it known that I, CLARENCE HORACE MONTGOMERIE Y AGRAMONTE, a citizen of the United States, residing at the city of Mexico, Republic of Mexico, have invented certain new and useful Improvements in Burner-Casings, of which the following is a specification, reference being had to the accompanying drawings.

This invention has relation to burner-casings; and it consists in the novel construction and arrangement of its parts, as hereinafter shown and described.

The object of the invention is to provide a casing especially adapted to be used in combination with hydrocarbon-burners.

The casing consists, primarily, of the lower globular portion, which constitutes a mixing-chamber, and is provided in its sides with air-ports, the said air-ports being so arranged with relation to each other that each one is opposite diametrically a solid of the burner—that is to say, said air-ports are not located opposite each other. Extending up over said globular portion is a portion integral therewith, which is flared laterally and flattened transversely. The lower end of the said casing is adapted to be secured to a casting which in turn is provided with an aperture for the reception of the burner and a gas-inlet and a drip-outlet.

In the accompanying drawings, Figure 1 is a side elevation of the burner-casing. Fig. 2 is a lateral sectional view of the burner-casing. Fig. 3 is a transverse sectional view of the burner-casing. Fig. 4 is a top plan view of the burner-casing. Fig. 5 is a horizontal sectional view of the burner-casing cut on the line 5 5 of Fig. 2, and Fig. 6 is a horizontal sectional view of the burner-casing cut on the line 6 6 of Fig. 3.

The burner-casing 1 is hollow throughout, and its lower part consists of the globular portion 2, while its upper part consists of the flared and flattened portion 3, integrally joined to said globular portion. The said globular portion is provided with a number of air-ports 4, said air-ports being so located with relation to each other that they are opposite solid portions of the wall diametrically across the globular portion 2—that is to say, said ports are not diametrically opposite each other. The upper portion 3 may be considered to be originally made in the form of a frustum of a cone which is flattened, forming the lateral walls 5 5, with the slightly-flared or curved edges 6 6. The upper edges of the walls 5 5 describe an upward curve, while the upper ends of the edges 6 6 describe a downward curve 8. (See Fig. 3.) The casting 9 is inserted and suitably secured in the lower end of the casing 1. Said casting is tapped, as at 10, for the reception of the burner and is also tapped, as at 11, to receive the end of the drip-pipe, and, as at 12, the said casting is tapped for the reception of the end of the gas-pipe.

The arrangement of the location of the air-ports 4 with relation to the burner and each other is such that the air may be admitted to the interior of the casing, and the volume of air from one port will not have a direct impact against the volume of air entering through any other port. The air thus admitted to the casing mixes in the globular portion 2 with the gas that is admitted through the burner. This mixture is then compressed by passing upward through the peculiar-shaped upper portion 3 of the burner-casing when it is ready to escape at the top thereof and ignite. The flame produced from a mixture of air and gas accomplished as above described possesses very intense heat and is admirably adapted for supplying the necessary heat for apparatus using hydrocarbon as a fuel.

Having thus described my invention, what I claim as new, and desire to secure by Letters Patent, is—

1. A burner-casing adapted to receive a burner, said casing consisting of a lower globular portion and a mixture-compression portion located above said globular portion and having two opposite sides merging into said globular portion in tangential lines and the other two opposite sides at an angle.

2. A burner-casing adapted to receive a burner, said casing consisting of a mixing-chamber and a mixture-compression portion located above said chamber and having its upper and lower ends formed substantially elliptical in cross-section, the longer axes of the upper and lower ellipses thereof being disposed at right angles to each other.

3. A burner-casing adapted to receive a burner consisting of a lower globular portion having air-ports, each said air-port being located in a line drawn diametrically across the burner-opening opposite solid walls of the casing, all of the said ports being located in the same plane and in the longest horizontal diameter of the globular portion and a means for compressing the mixture located above said globular portion.

In testimony whereof I affix my signature in the presence of two witnesses.

CLARENCE HORACE
    MONTGOMERIE Y AGRAMONTE.

Witnesses:
  CHARLES READ,
  LOUIS HYDE COOKE.